United States Patent
Ku et al.

(10) Patent No.: US 6,427,232 B1
(45) Date of Patent: Jul. 30, 2002

(54) FUNCTIONAL DEBUGGER FOR DEBUGGING SOFTWARE PROGRAMS

(75) Inventors: William Hsiao-Yu Ku, Austin; Joey Allen Perry, Pflugerville; John Shih-Yuan Wang, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/329,454

(22) Filed: Jun. 10, 1999

(51) Int. Cl.[7] ................................................. G06F 9/44
(52) U.S. Cl. ....................... 717/124; 717/129; 717/142; 717/144
(58) Field of Search ............................... 717/4, 7, 8, 9, 717/124, 129, 142, 144, 139, 155; 702/119; 703/23; 712/227; 714/779

(56) References Cited

U.S. PATENT DOCUMENTS

| | | | | |
|---|---|---|---|---|
| 5,432,795 A | * | 7/1995 | Robinson | 717/125 |
| 5,446,900 A | * | 8/1995 | Kimelman | 717/124 |
| 5,463,764 A | * | 10/1995 | Mueller | 714/15 |
| 5,579,469 A | | 11/1996 | Pike | 395/326 |
| 5,598,560 A | * | 1/1997 | Benson | 717/7 |
| 5,659,753 A | * | 8/1997 | Murphy et al. | 717/5 |
| 5,717,883 A | * | 2/1998 | Sager | 712/218 |
| 5,758,061 A | * | 5/1998 | Plum | 714/35 |
| 5,832,271 A | | 11/1998 | Devanbu | 395/705 |
| 5,854,924 A | * | 12/1998 | Rickel et al. | 717/132 |
| 6,061,518 A | * | 5/2000 | Hoffman | 717/124 |
| 6,065,078 A | * | 5/2000 | Falik et al. | 710/100 |
| 6,077,312 A | * | 6/2000 | Bates et al. | 717/129 |
| 6,106,572 A | * | 8/2000 | Halpern | 717/130 |
| 6,145,122 A | * | 11/2000 | Miller et al. | 717/130 |
| 6,175,913 B1 | * | 1/2001 | Chesters et al. | 712/227 |
| 6,182,243 B1 | * | 1/2001 | Berthe et al. | 714/38 |
| 6,186,677 B1 | * | 2/2001 | Angel et al. | 717/4 |
| 6,189,141 B1 | * | 2/2001 | Benitez et al. | 717/4 |
| 6,202,205 B1 | * | 3/2001 | Saboff et al. | 717/9 |

OTHER PUBLICATIONS

Orso et al, "Incremental slicing based on data dependences types", SW Mainteance, Proc. of IEEE, pp 158–167, 2001.*
Aral et al, "High level debuging in parasight", Proc. of ACM SIGPLAN, pp 151–162, 1988.*
Chen et al, "Reversible debugging using program instrumentation", IEEE, pp 715–727, 2001.*
Hary et al, "Users preference among different technique for displaying the evaluation of LISP functions in an interactive debugger", ACM CHI, pp. 45–50, Sep. 1988.*
Rajamony et al, "Performance debugging shared memory parallel programs using run time dependence analysis", ACM SIGMETRICS, pp 75–87, Feb. 1997.*

* cited by examiner

Primary Examiner—Anil Khatri
(74) Attorney, Agent, or Firm—David A. Mims, Jr.; Robert V. Wilder

(57) ABSTRACT

A method and implementing computer system is provided in which a software debug program is operable to display to a user the flow of a program being debugged. The program flow is illustrated in an example by highlighting, on a program structural representation which is presented on a display screen, the locations of sequential calls within the program being debugged. In one example, a user is selectively able to stop the debug program at any observed step within the displayed flow sequence, to make programming changes or take other action as may be appropriate. In the example, the debug program user is also able to select an automatic sequencing through the flow of a program being developed and to designate a preferred display time duration for each step of the displayed sequencing.

12 Claims, 10 Drawing Sheets

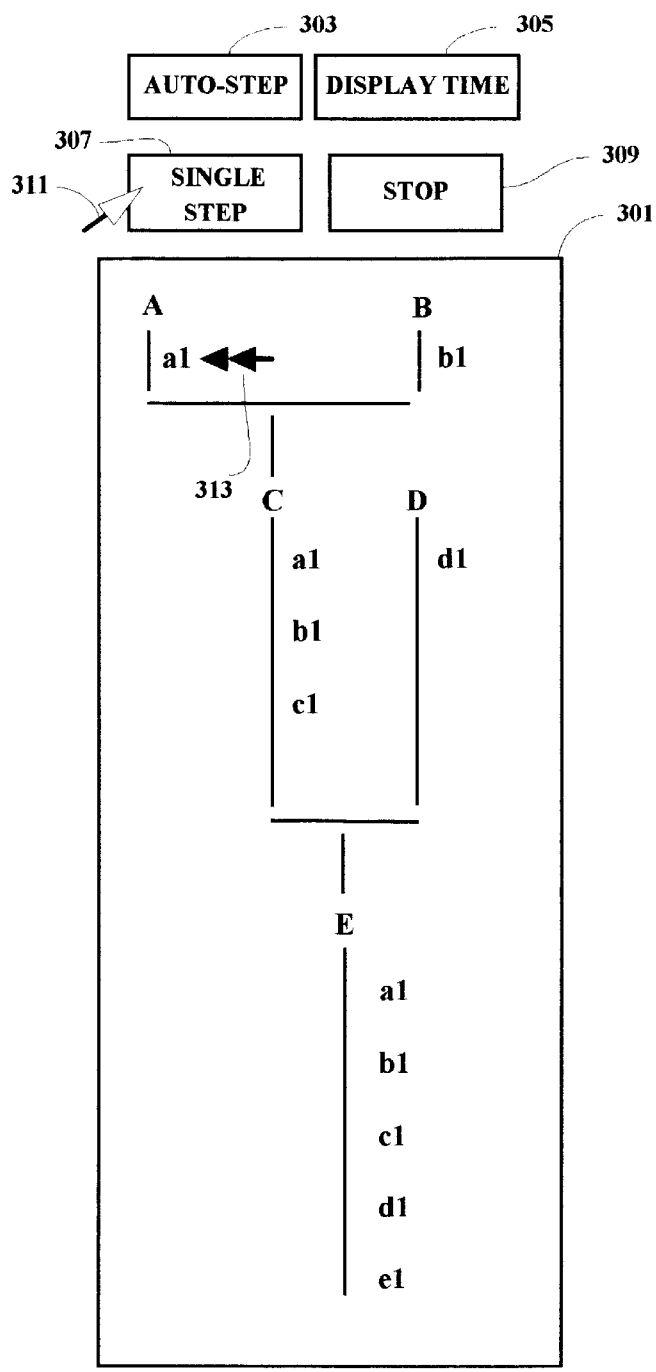
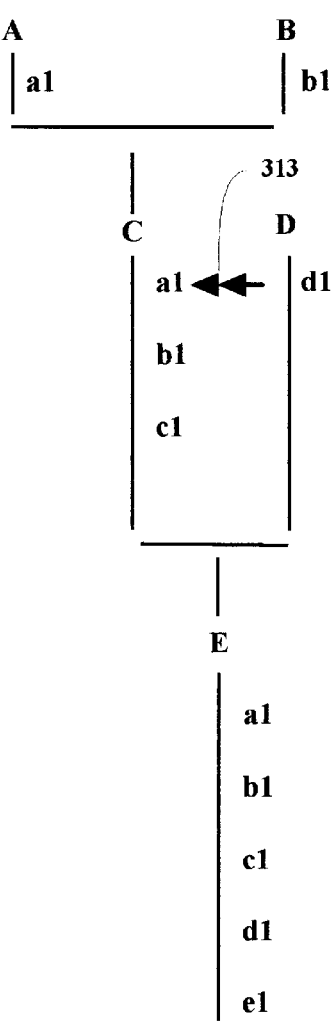
*FIG. 3*                *FIG. 4*

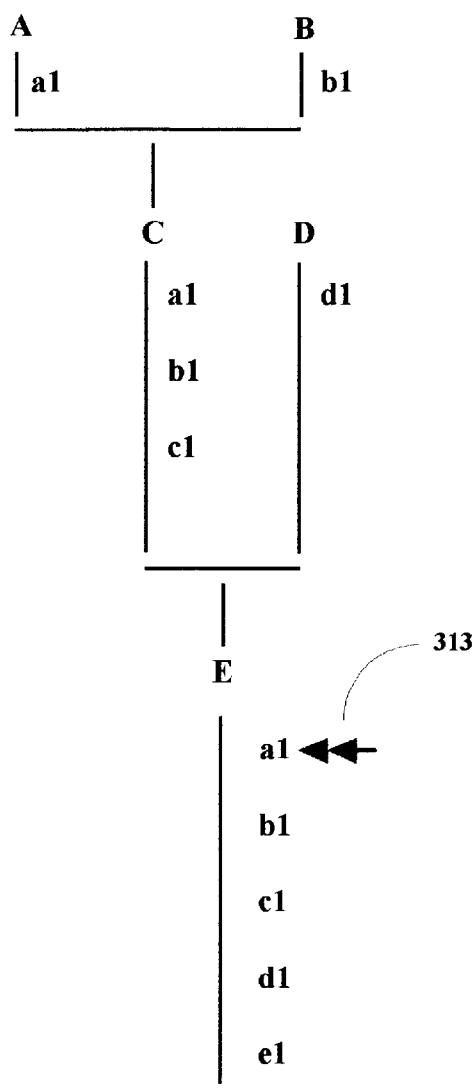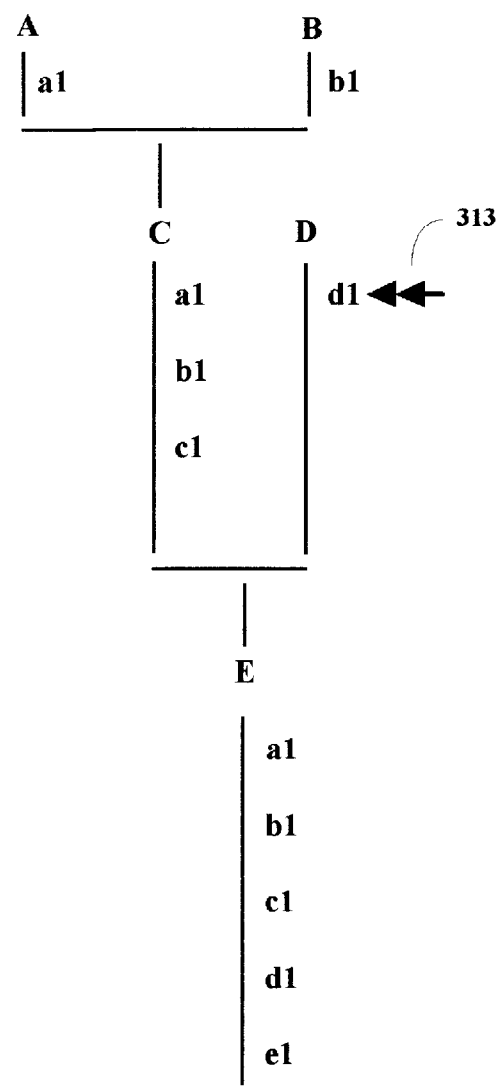
FIG. 5　　　　　FIG. 6

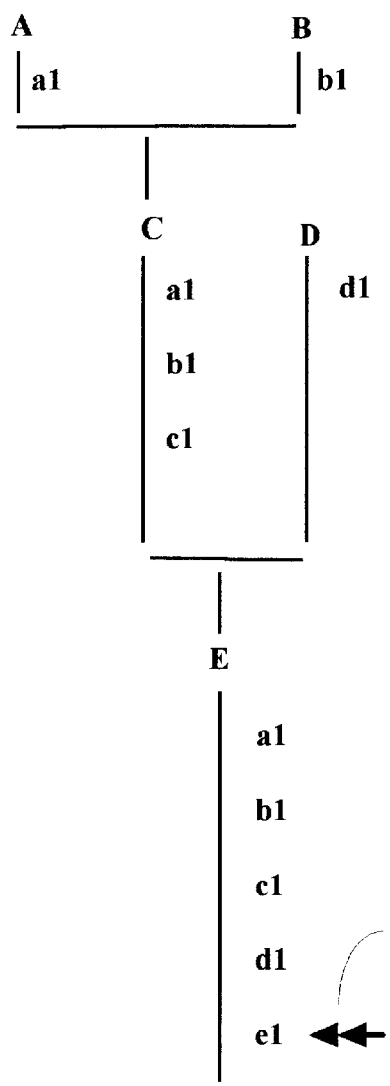 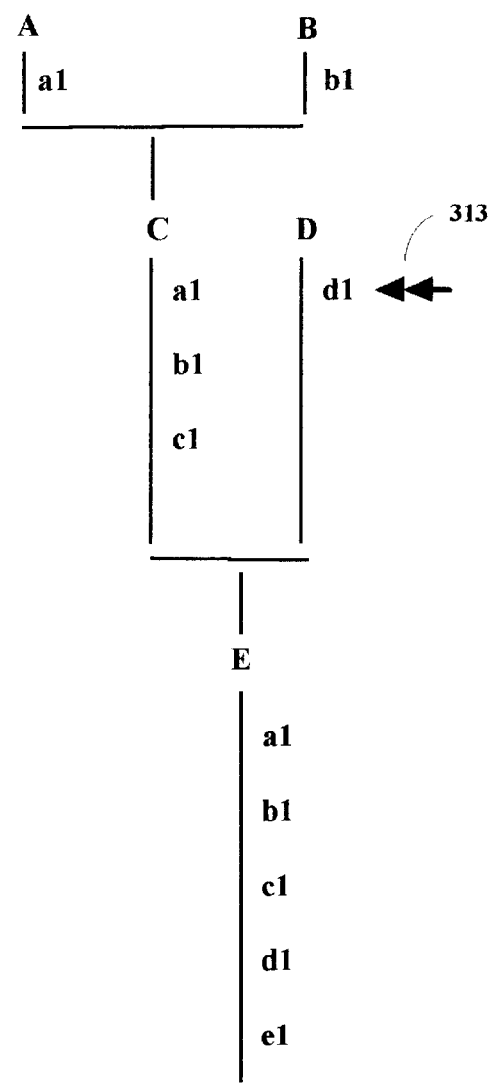
*FIG. 9*        *FIG. 10*

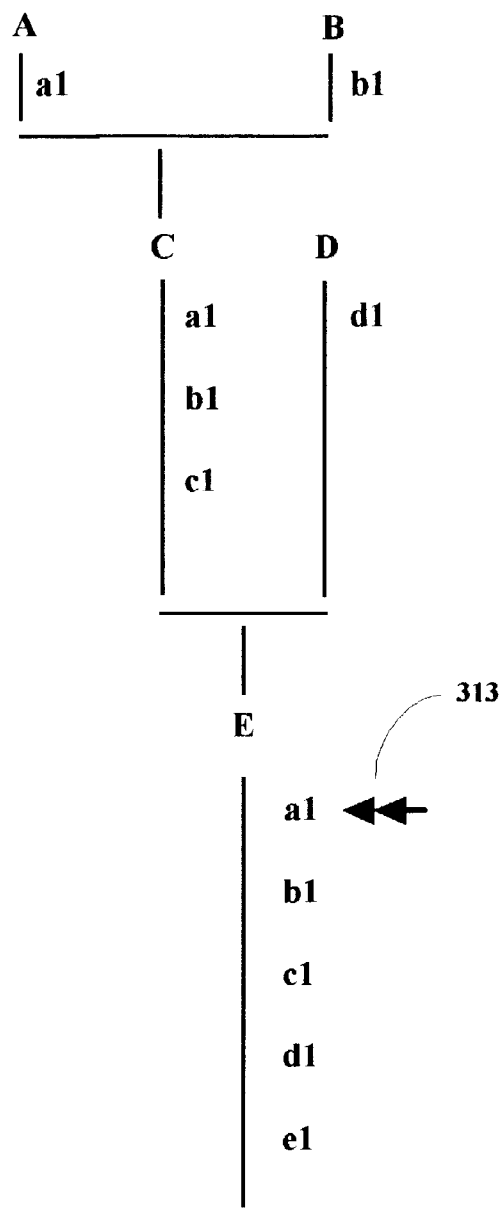
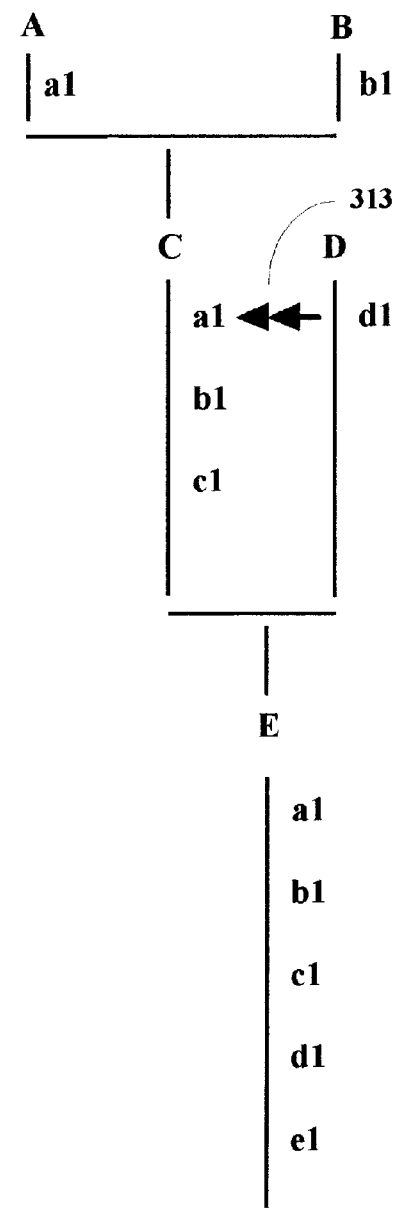
*FIG. 11*    *FIG. 12*

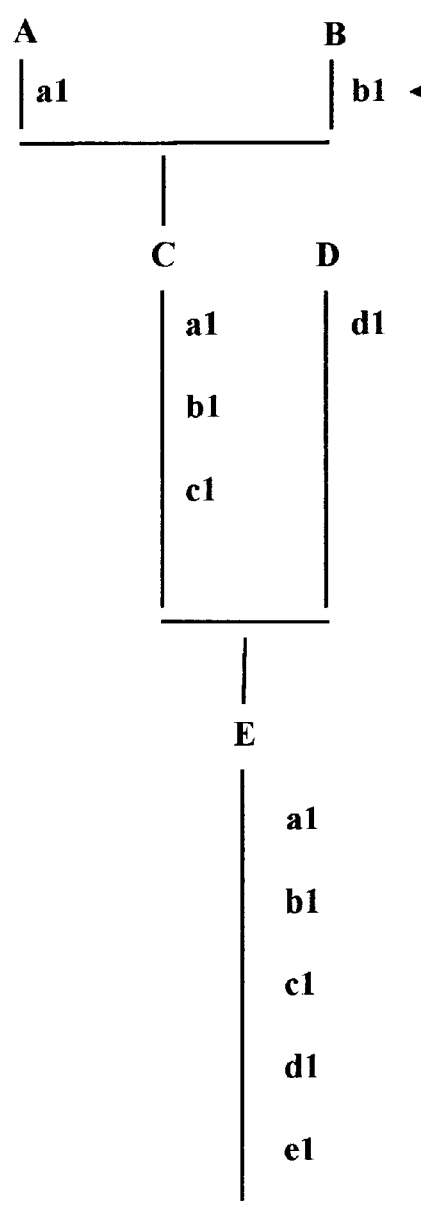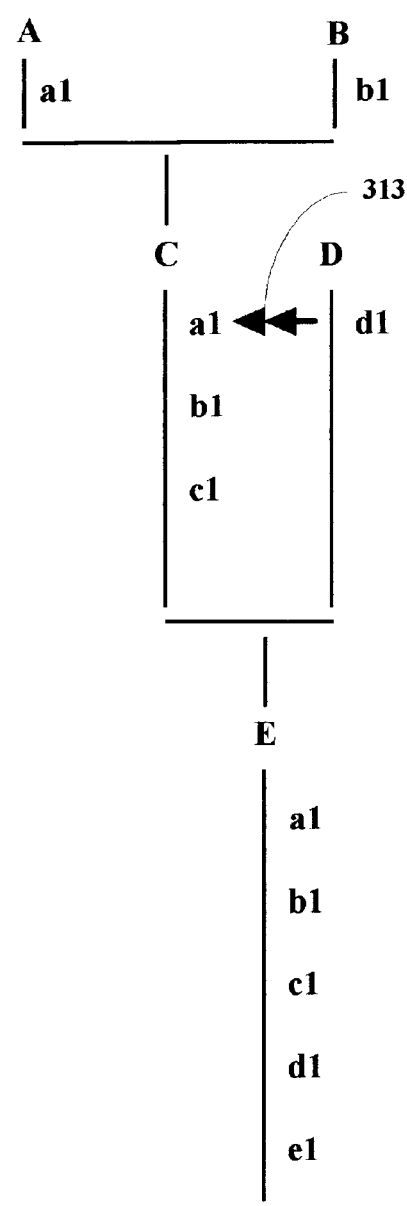
*FIG. 13*         *FIG. 14*

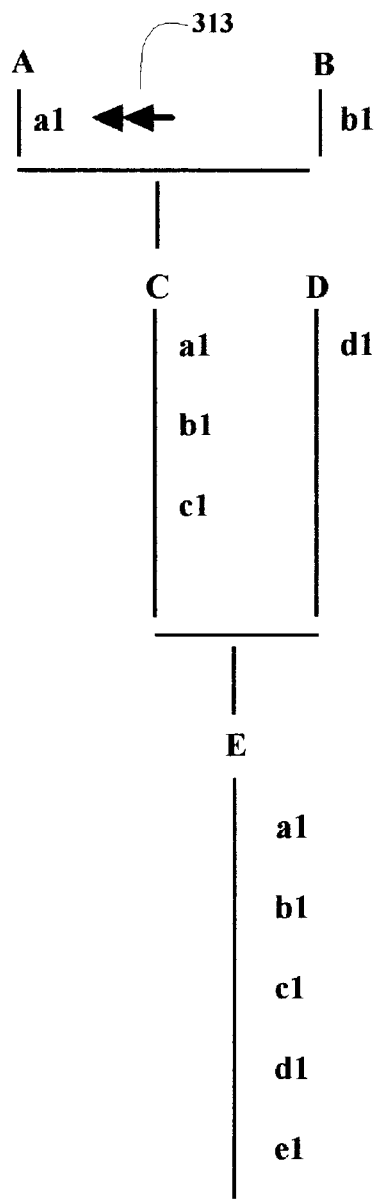
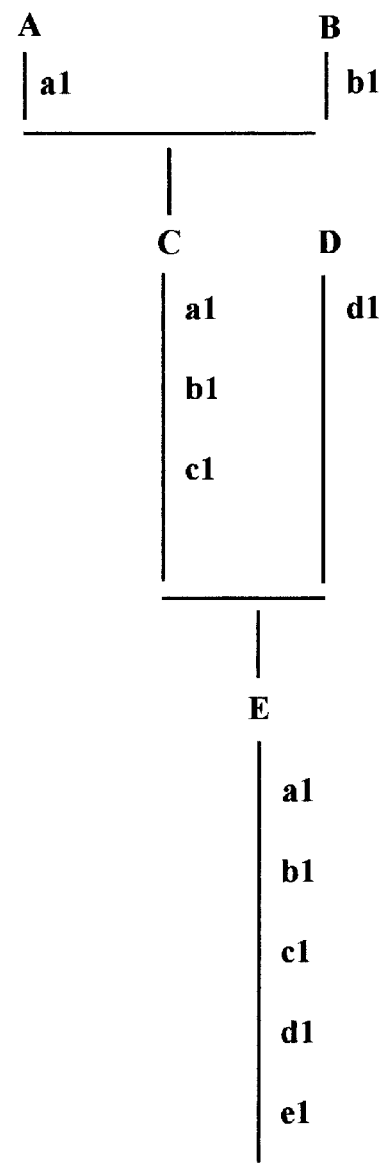
*FIG. 15*  *FIG. 16*

FUNCTIONAL DEBUGGER FOR DEBUGGING SOFTWARE PROGRAMS

FIELD OF THE INVENTION

The present invention relates generally to information processing systems and more particularly to a methodology and implementation for debugging software programs.

BACKGROUND OF THE INVENTION

In the preparation and design of software for execution within a computerized system, a great deal of time is spent in what is known as "debugging" the initial versions of the software or program. Debugging is the process of testing and verifying the program under varying conditions to ensure that the program will operate as intended under any situation and in many different systems. Debugger programs are generally used in the debugging process. Debugging programs are executed within a computer system and operate on the program being developed. Program developers work at a computer workstation and provide various inputs to the testing computer system, which is generally a PC or computer workstation. The user inputs are processed by a debugger program which operates on the code being tested and provides resulting outputs to the user or developer. This is an exhausting iterative and very intensive process which can take a great deal of time before a program has been thoroughly debugged and ready for release to an operational environment.

During the debugging process, it is sometimes determined that the basic flow of a program under test needs to be changed for any of many possible reasons. Unfortunately, much of the time, that decision is made after many hours, days and even months have already been spent in debugging the developing program. Once the basic flow is changed, the developing program will need to be fully debugged again and all of the initial debugging time using the initial flow of the developing program will be lost. Sometimes, especially in object oriented program design, the program designer may only want to know the control flow of each method involved without having to know the detail flow within each method. The designer may also want to know when the control flows from one method to another, or the class of the current executed method without having to remember or reference any opened file.

Thus, there is a need for an improved methodology and implementing system which enables a user to test a program under development for control flows within the program and to provide positive output to the user with regard to control flow of the program.

SUMMARY OF THE INVENTION

A method and implementing computer system is provided in which a software analyzing program is operable to display to a user the flow of a program being analyzed. The program flow is illustrated in an example by highlighting, on a displayed program structural representation, the methods referenced in corresponding calls detected in the program code being analyzed. In one example, a user is able to select an automatic sequencing through the flow of a program being analyzed and to designate a preferred display time duration for each step of the displayed sequencing, or to be prompted to proceed step-by-step through the flow of the code being analyzed.

BRIEF DESCRIPTION OF THE DRAWINGS

A better understanding of the present invention can be obtained when the following detailed description of a preferred embodiment is considered in conjunction with the following drawings, in which:

FIG. 3 is an illustration of an exemplary display screen format used in displaying program flow sequential calls of a program being debugged in accordance with the present invention;

FIG. 4 shows a sequential display screen in the illustrated example;

FIG. 5 shows the next sequential display screen in the illustrated example;

FIG. 6 shows the next sequential display screen in the illustrated example;

FIG. 9 shows the next sequential display screen in the illustrated example;

FIG. 10 shows the next sequential display screen in the illustrated example;

FIG. 11 shows the next sequential display screen in the illustrated example;

FIG. 12 shows the next sequential display screen in the illustrated example;

FIG. 13 shows the next sequential display screen in the illustrated example;

FIG. 14 shows the next sequential display screen in the illustrated example;

FIG. 15 shows the next sequential display screen in the illustrated example;

FIG. 16 shows the next sequential display screen in the illustrated example;

DETAILED DESCRIPTION

Figure 1:
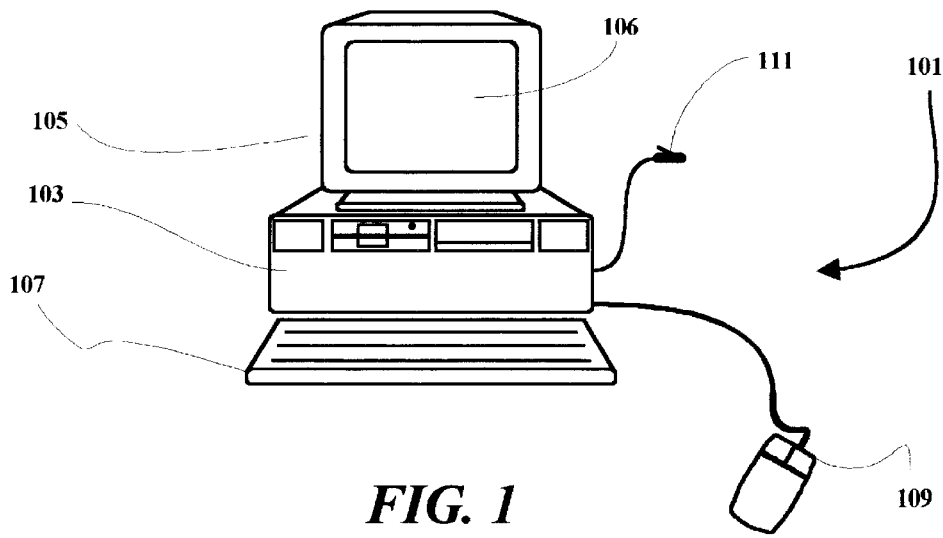
FIG. 1 is a diagram of a computer system in which the present invention may be implemented.

The various methods discussed herein may be implemented within a typical computer system which may include a workstation or personal computer. A general discussion of an exemplary computer system is therefore presented prior to the discussion of the methodology implemented thereby.

In general, an implementing computer system may include a plurality of processors in a multi-bus system in a network of similar systems. However, since the workstation or computer system implementing the present invention in an exemplary embodiment, is generally known in the art and composed of electronic components and circuits which are also generally known to those skilled in the art, circuit details beyond those shown in the drawings are not specified to any greater extent than that considered necessary as illustrated, for the understanding and appreciation of the underlying concepts of the present invention and in order not to obfuscate or distract from the teachings of the present invention.

In FIG. 1, a computer system 101 includes an electronics enclosure 103 which is typically arranged for housing one or more CPUs (central processing units) along with other component devices and subsystems of the computer system 101. The computer system 101 also includes a monitor or display unit 105 including a display screen 106, a keyboard 107 and a mouse or pointing device 109, which are all interconnected within the illustrated computer system. Also shown is a connector 111 which is arranged for connecting a modem within the computer system to a communication line such as a telephone line in the present example.

Figure 2:
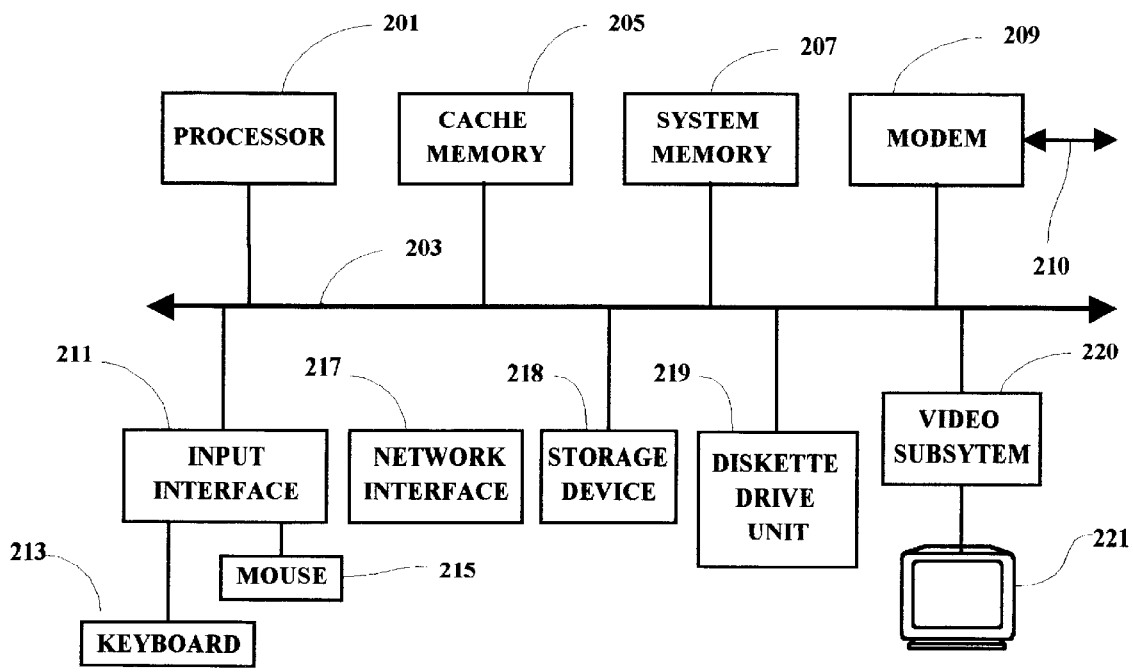
FIG. 2 is a simplified schematic diagram showing selected components and subsystems of the computer system illustrated in FIG. 1.
Figure 7:
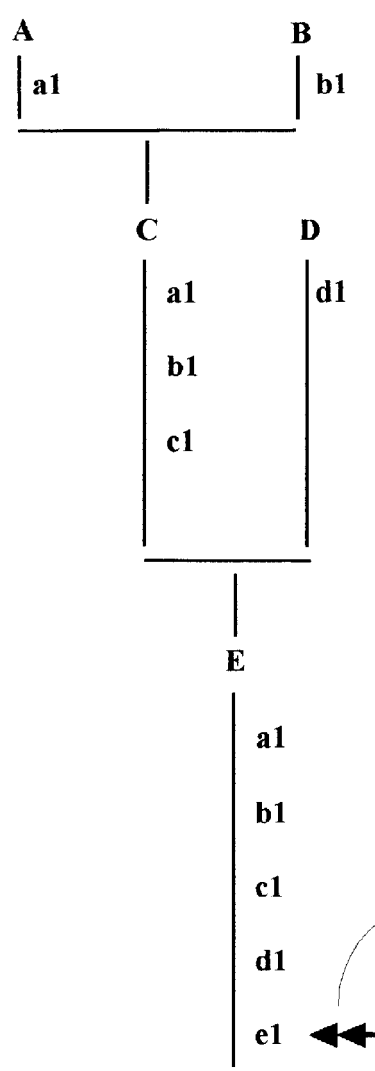
FIG. 7 shows the next sequential display screen in the illustrated example.
Figure 8:
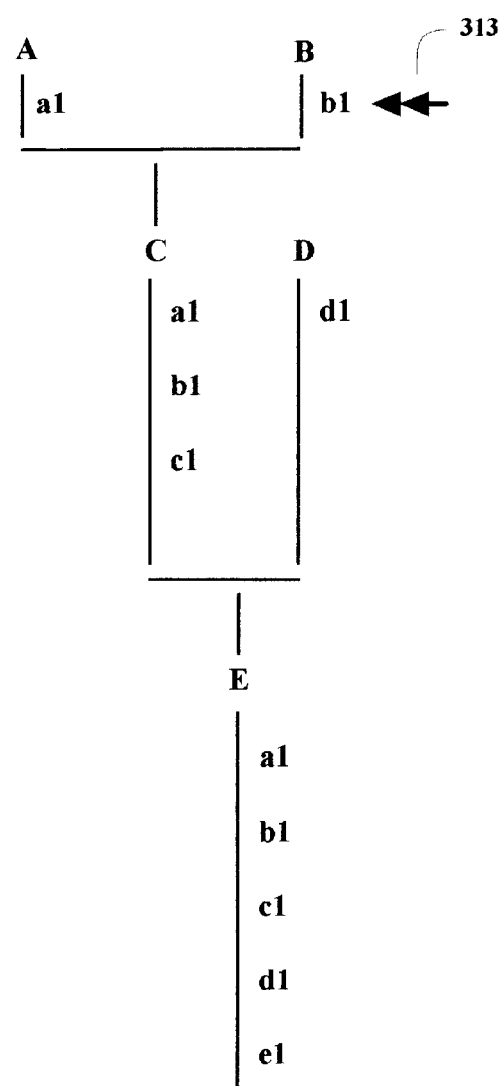
FIG. 8 shows the next sequential display screen in the illustrated example.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a separate network subsystem interface 217 and a diskette drive unit 219. A video subsystem 220, which may include a graphics subsystem, is connected to a display device 221. A storage device 218, which may comprise a hard drive unit or CD ROM, is also coupled to the bus 203. The diskette drive unit 219 provides a means by which individual diskette programs may be loaded on to the hard drive, or accessed directly, for selective execution by the computer system 101. As is well known, program diskettes containing application programs represented by magnetic indicia on the diskette, or programs in system memory, or acquired through a local network or through the world wide web may be read to provide program signals. Such program signals are selectively effective to cause the computer system to present displays on the screen of a display device and respond to user inputs in accordance with a program being executed, such as a debug program in the present example.

A functional debug program or debugger in accordance with the present invention, shows, on a display screen, the control flows from one class method to another. This is different from a traditional debugger since traditional debug programs shows the details of the program execution. In Object Oriented programming design, the program control flows between the different methods of classes may be of primary interest to a programmer. As hereinafter described in detail, first the class hierarchy is defined as illustrated in FIG. 3. Each method is emitted by the class emitter and the program then waits for the programmer to fill in the detail. Before the detail program design is started, the programmer needs to know that the class hierarchy design is correct since an incorrect class hierarchy design may result in much wasted coding time lost.

By using the disclosed functional debugger program, the program designer can single step or auto-step through the program execution path before any detailed coding is completed. This is possible because the disclosed functional debug program is only interested in the critical steps which include, in the present example, either a method call to another class or just an exit from the current method. All of the values for either of the local or global variables are not of concern within the functional debugger. The functional debugger as herein disclosed is concerned with the program flow and to present the program flow to the designer in an easy-to-understand presentation and format.

In running a debug program on the computer system 101, the program is typically stored in the storage device 218 and either selectively or automatically, partially or totally, loaded into the system memory 207 when the system is initially powered-on, or at a later time if so desired by a user. A debug program user is able to selectively access and execute the debug program as herein described, either directly from a diskette in the diskette drive unit 219 or directly from a copy of the debug program stored on the hard drive unit 218 or downloaded from a server or another location. As the debug program is running, either a portion of the program or the entire program may be loaded into the system memory 207 and/or the system cache memory 205. Assuming a user has started-up the system, and is actively running a debug process on program code which is being debugged, all of the class hierarchy tree, the class names and all of it's methods and inherited methods are shown on the display device 106. Each screen presented while the debug program is operating typically has framed or distinct screen areas which may be selected by the user to activate various functions available in the debug program.

In FIG. 3, for simplicity, only one hierarchy tree is displayed to a functional debug program user in the present example. The illustrated portions of a user display screen include an exemplary class inheritant hierarchical representation enclosed in the example in a window or frame 301. As shown, class E is inherited from classes C and D. Class C is inherited from classes A and B. Class A has method a1. Class B has method b1. Class C has method c1 and inherits methods a1 and b1. Class D has method d1. Class E has method e1 and inherits methods a1, b1, c1, and d1. In other framed screen areas, there is shown an "AUTO-STEP" selection 303, a "DISPLAY TIME" selection 305, a "SINGLE STEP" selection 307 and a "STOP" selection 309. These selections may be made by a user by pointing to the screen area with screen pointer 311 and clicking a switch on an actuating device such as mouse 109. If a user selects "SINGLE STEP" 307, the functional debugger will move to the next execution and wait for the user's input. An indicium, for example double-arrow 313, is displayed at each step of the process. The indicium may be any device useful in attracting the user's attention. The double-arrow example may also have a blinking characteristic to attract attention and to also indicate that the debug program is active at the point indicated. By following the progress of the flow indicium 313, a user may follow the flow of the program being designed to ensure that the program flow has been implemented as designed. The user, in the example, is also able to "STOP" the sequencing through the flow by selecting the "STOP" button 309 in order to use other available features of the debug program and/or to change the flow design of the program being debugged. If the user selects the AUTO-STEP button 303, the user may also select the "DISPLAY TIME" button 305 which will present, for example, a list of display times from which the user may choose before selecting the "START" button. The selected display time will determine the amount of time that the indicium 313 will remain at one flow position in the architectural tree before proceeding to the next position in the flow of the program 201, being debugged. In this manner, the user can ensure that the indicium 313 remains at each position in the architectural representation, in response to the detected program flow, for a period of time sufficient to allow the user to currently view and notice the flow sequence encountered. For example, if a user selects "5 seconds" as a display time, the flow indicium 313 will remain at each flow position for a period of five seconds before proceeding to the next detected call in the program being debugged. In this manner, a user is able to see the complete flow without interruptions. This flow sequence may also be stored in memory in any of many forms for current or later print-out or viewing to provide a fail-safe feature.

In the present example, the functional debugger is implemented in connection with an Interface Repository (IR) Browser. The IR browser represents the containment and inheritance hierarchies of classes. When a method is called, the IR browser will highlight the method of that class using the displayed flow indicium 313 to indicate the current control flow. This can be done by using the same kind of programming technique as with a trace program. Instead of writing the information into a log file, on method entry the trace routine would write information into shared memory, and the IR browser can use that information from the shared memory to highlight the current executed method displayed at run time. The functional debugger will then either display the indicium for a period of time selected by the user or will wait after each step for the user to start the display of the flow indicium for the next call or exit line. With the disclosed functional debugger, the user does not have to set break points for entry and exit of each method and therefore the debug time will be substantially reduced.

Since the containment and inheritance hierarchies are displayed graphically during debugging, the user knows exactly which method of which class is currently being executed. This will give the user a clear picture of the control flow to help the user better design the program product being developed.

In the illustrated example, the control flow of the program being debugged is as follows:→A::a1→C::a1→E::a1→D::d1→E::e1→B::b1→E::e1→D::d1→E::a1→C::a1→B::b1→C::a1→A::a1.

Thus, when the functional debugger is started, a method a1 of class A is invoked and the display screen flow indicium 313 points to the displayed representation of class A, method a1 (A::a1) as shown in FIG. 3. Next, as shown in FIG. 4, the method a1 of class A is calls method a1 of class C, and the method a1 of C is pointed to by the flow indicium 313 in the displayed hierarchy. Similarly, as shown in FIG. 5 through FIG. 16, as each call to another method is detected, the flow indicium 313 is displayed as pointing to the current method in the above program flow. As hereinbefore noted, the user can stop the stepping through of the program being debugged at any time, whether in auto-step mode or the default single step mode, to modify the details of the code in the current method being highlighted.

An exemplary pseudocode listing of many possible pseudocode implementations for the functional debugger is set forth below:

```
BEGIN
  Reset AUTO flags;
  Repeat
    Highlight the class and method ICON for the current program entry:
      If (AUTO flag is set)
        Wait for the amount of time defined by the user;
      Else
        Wait until user provides input;
        If (Autostep is selected)
          Set AUTO flag;
          Wait for user to define the step time duration;
```

-continued

```
        Endif;
      Endif;
    Allow program to execute to the next critical step;
    If (critical step is calling a method of a class)
      Identify the class and method;
    Else (must be the end of the current method
      Identify the class and method that the program returned;
    Endif;
  Until (returned class/method is not on class hierarchy tree);
End.
```

Figure 17:
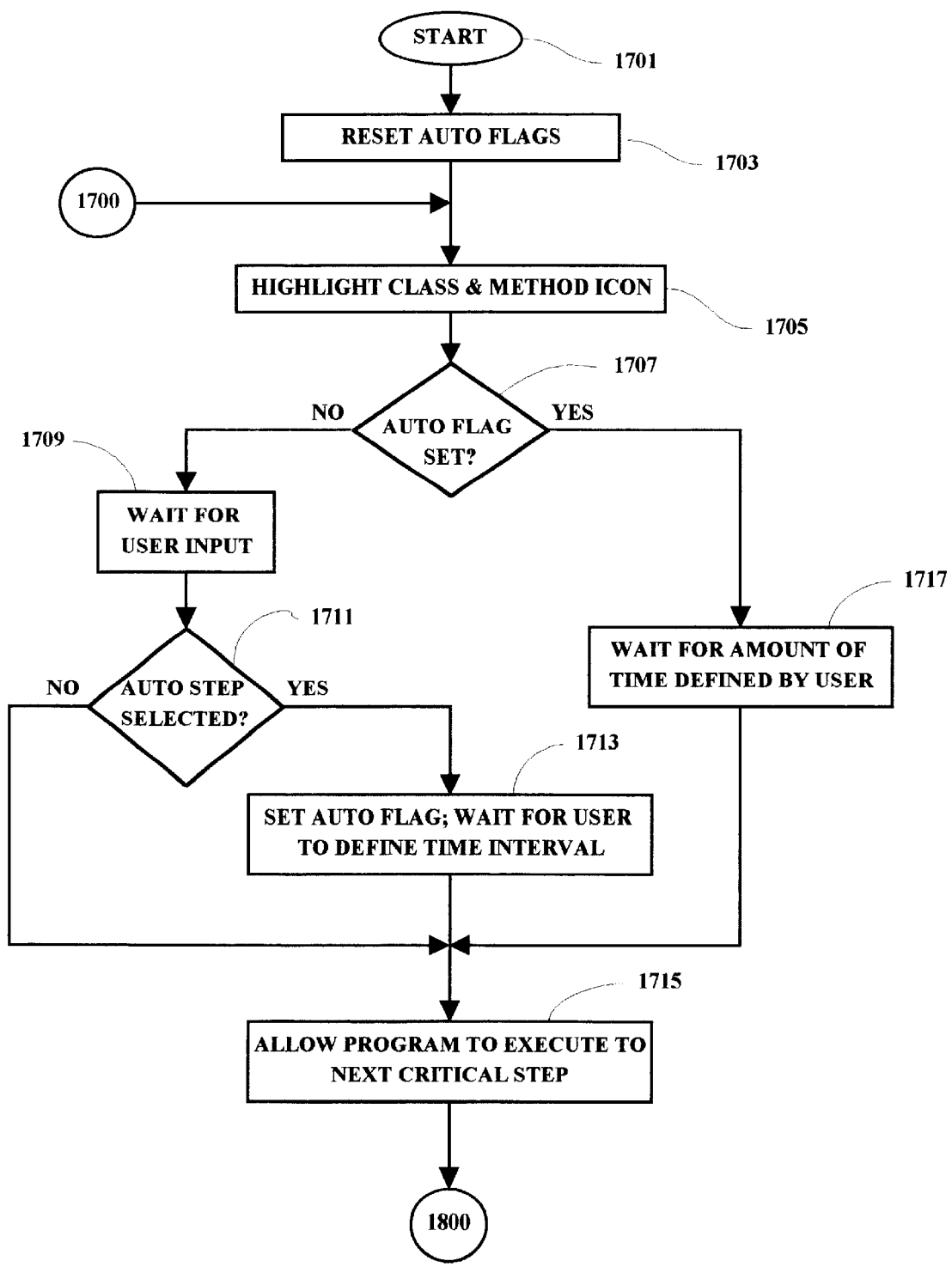
FIG. 17 is a flow chart of the operational sequence implemented in the exemplary embodiment.
Figure 18:
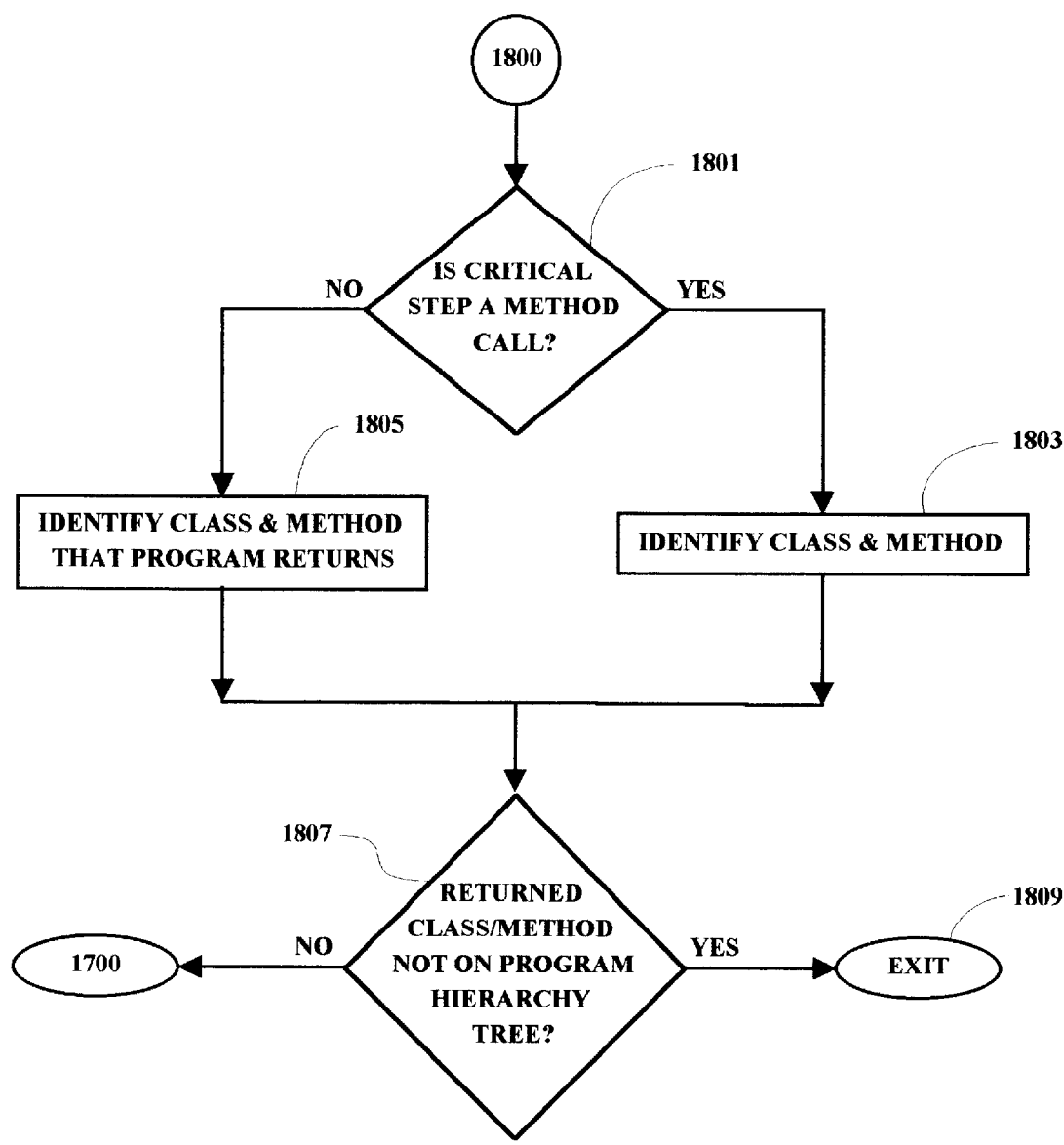
FIG. 18 is a continuation of the flow chart illustrated in FIG. 17.

The above specified pseudocode is set forth in flow chart form in FIG. 17 and FIG. 18. In FIG. 17, when the functional debugger program starts 1701, the AUTO FLAG is reset 1703 and the first class and method icon or representation of the hierarchical tree is highlighted 1705. This is also a return point 1700 for each stepping in the flow of the program being debugged. A check is then made to determine if the AUTO FLAG is set 1707. The AUTO FLAG refers to whether or not the AUTO-STEP selection 303 has been made by the functional debugger program user. If the AUTO FLAG has been set 1707, the program will wait for a time duration 1717, after which the program will be allowed to execute the program being debugged to the next critical step 1715. In the example, the critical steps are method "calls" that are detected in the program being debugged. If the AUTO FLAG has not been set 1707, then the program will wait for user input 1709, for example when the user again selects the SINGLE STEP button 307 with the pointer 311. A check is then made to determine if AUTO-STEP has been selected 1711. For example, a user may decide to switch to AUTO-STEP after running through several single steps, one at a time in the manual mode. If AUTO-STEP has not been selected, the program goes directly to the next critical step 1715. If, however, AUTO-STEP has been selected 1711, the AUTO flag is set and 25 the program waits for the user to select the time interval 1713 for the display duration of each flow step detected before proceeding to the next critical step in block 1715. From block 1715, the program continues to point 1800 in FIG. 18.

In FIG. 18, a check is next made to determine if the critical step is a method call 1801. If it is a method call, then the program identifies the class and method 1803 and returns to point 1700 to highlight the class and method icon 1705 and continue the program. If the critical step is not a method call 1801, then the class and method that the program returns is identified 1805 and a check is made to determine if the returned class and method is on the hierarchy tree 1807. If the returned class and method are not on the program hierarchy tree for the program being debugged 1807, the program then exits the functional debugger program 1809. If the returned class and method is in the program hierarchy tree of the program being debugged 1807, then the program returns to point 1700 to highlight class and method returned 1705 and continue with the processing as hereinbefore explained.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for displaying a flow sequence for a program, said method comprising:

displaying a program hierarchy for said program on a display screen, said program hierarchy comprising an inheritance tree including a listing of classes and methods of said program;

scanning source code for said program;

emphasizing portions of said program hierarchy on said display screen during said scanning in response to a detection of a predetermined characteristic of said program source code, said emphasized portions of said displayed program hierarchy comprising a sequential emphasizing of selected ones of said methods, said predetermined characteristic comprising a predetermined instruction detected during said scanning; and pausing during said scanning while each of said selected methods is emphasized upon each detection of said predetermined instruction.

2. The method as set forth in claim 1 wherein said pausing is terminated and said scanning is resumed following a user input.

3. The method as set for the in claim 1 wherein said pausing continues for a predetermined time period after each detection of said predetermined instruction.

4. The method as set forth in claim 3 and further including:

presenting a selection screen to a user; and enabling said user to select said predetermined time period.

5. The method as set forth in claim 1 wherein said predetermined instruction is a call instruction.

6. The method as set forth in claim 1 wherein said predetermined instruction is an exit instruction.

7. The method as set forth in claim 1 wherein emphasizing is accomplished by highlighting said selected ones of said methods.

8. The method as set forth in claim 1 wherein said emphasizing is accomplished by displaying an indicium to indicate said selected method.

9. The method as set forth in claim 8 wherein said indicium is an arrow, said arrow being arranged to point to said selected method.

10. The method as set forth in claim 1 wherein said predetermined characteristic of said program source code is a call instruction, and said emphasized method corresponding to each of said detections is a method referenced in said call instruction.

11. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective to effect a scanning of program code for a program being debugged, said program signals being selectively operable to accomplish the steps of:

displaying a program hierarchy for said program being debugged, said program hierarchy being displayed on a display screen, said program hierarchy comprising an inheritance tree including a listing of classes and methods of said program;

emphasizing portions of said program hierarchy on said display screen during said scanning in response to a detection of a predetermined characteristic of said program source code, said emphasized portions of said displayed program hierarchy comprising a sequential emphasizing of selected ones of said methods, said predetermined characteristic comprising a predetermined instruction detected during said scanning; and pausing during said scanning while each of said selected methods is emphasized upon each detection of said predetermined instruction.

12. A flow indicating system for use in tracing an operational flow of a program being analyzed, said flow tracing system comprising:

a processing device;

a system bus, said processing device being coupled to said system bus;

a memory unit couple to said system bus;

a display device including a display screen, said display device being coupled to said system bus, said flow tracing system being selectively operable for executing a tracing program in said memory unit for scanning source code for said program being analyzed and effecting a display of a program hierarchy for said program being analyzed, said program hierarchy being displayed on said display screen, said program hierarchy comprising an inheritance tree including a listing of classes and methods of said program, said flow indicating system being further selectively operable for emphasizing portions of said program hierarchy on said display screen during said scanning in response to a detection of a predetermined characteristic of said source code, said emphasized portions of said displayed program hierarchy comprising a sequential emphasizing of selected ones of said methods, said predetermined characteristic comprising a predetermined instruction detected during said scanning; and pausing during said scanning while each of said selected methods is emphasized upon each detection of said predetermined instruction.

* * * * *